Oct. 29, 1940. T. C. VAN DEGRIFT 2,219,795
MASS CENTERING MACHINE
Filed March 31, 1937 16 Sheets-Sheet 2
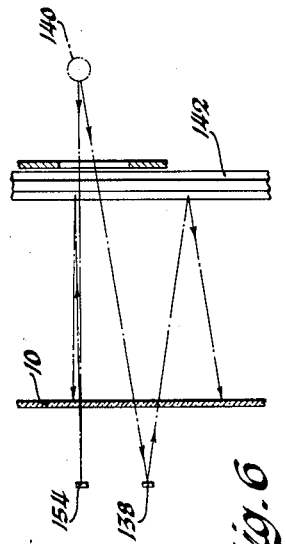
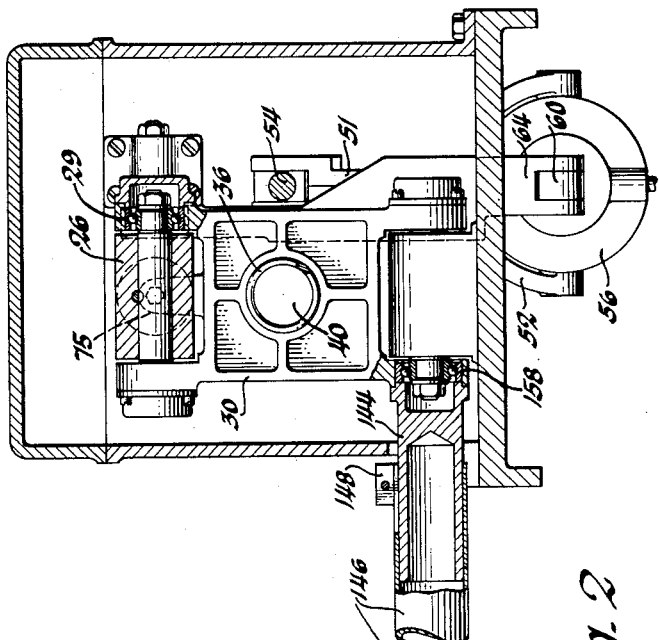
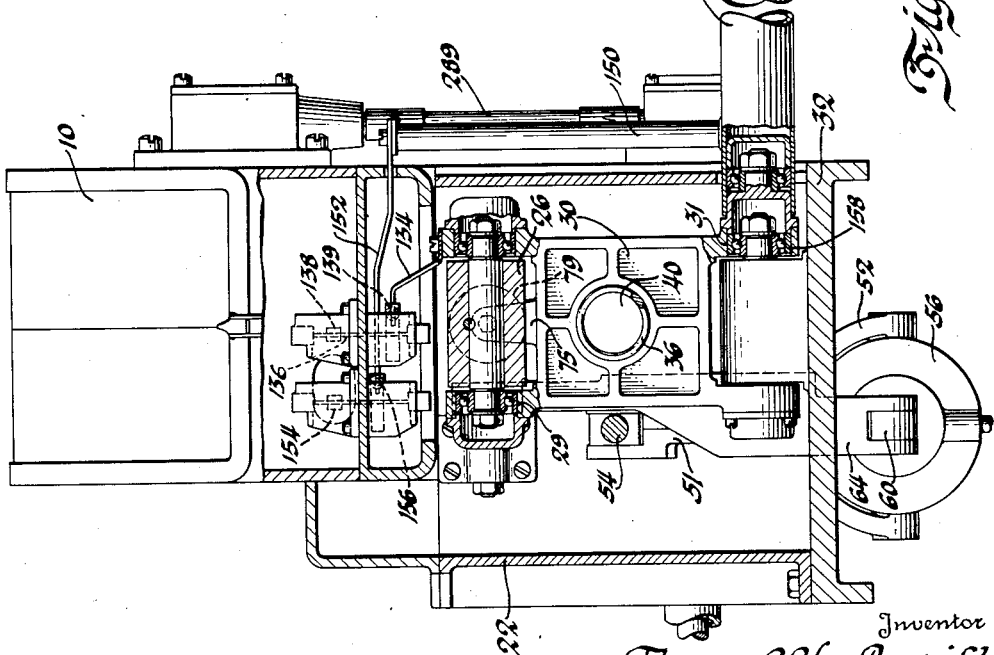
Inventor
Thomas C. Van Degrift
By Blackmore, Spencer & Flint
Attorneys

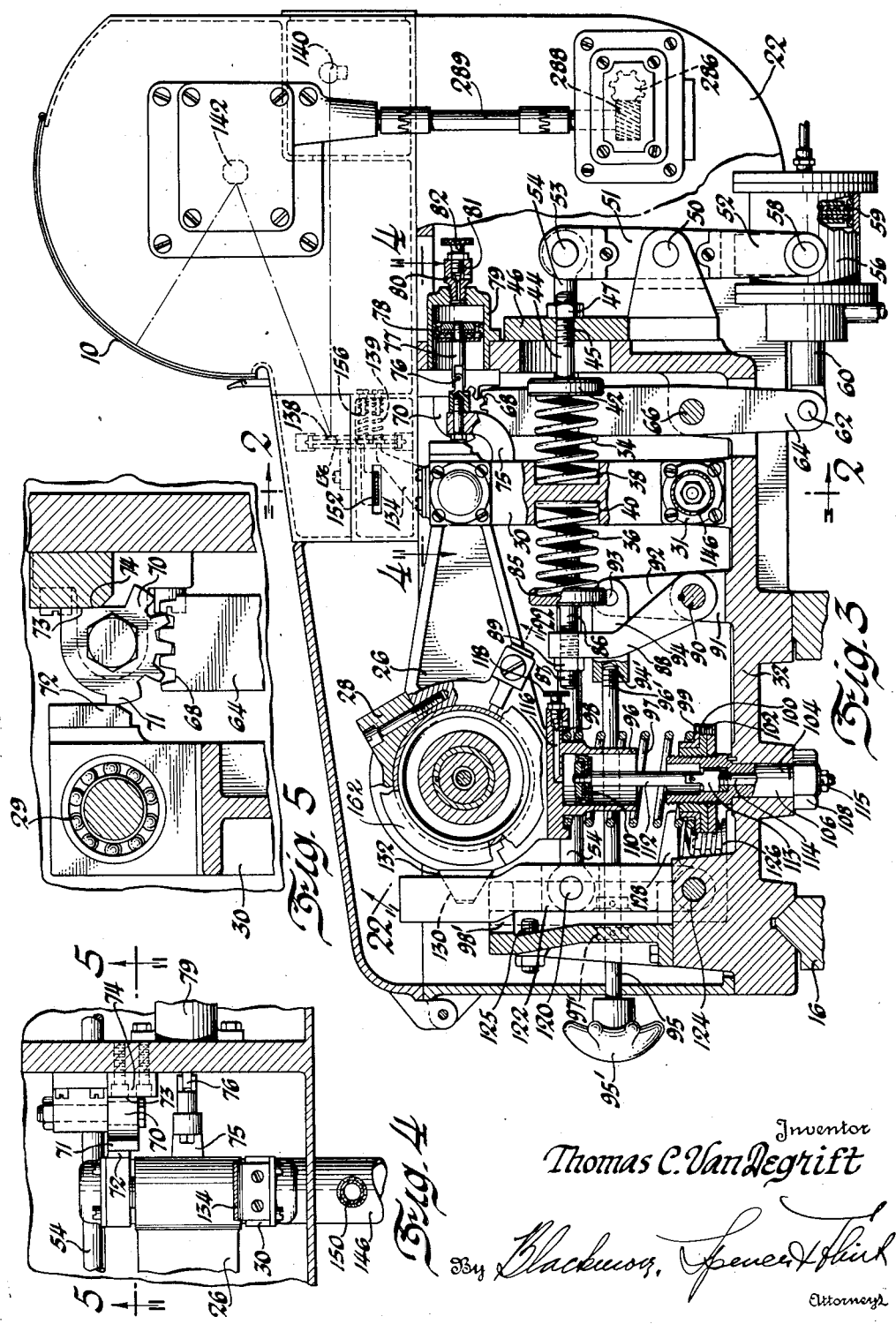

Oct. 29, 1940. T. C. VAN DEGRIFT 2,219,795
MASS CENTERING MACHINE
Filed March 31, 1937 16 Sheets-Sheet 4

Inventor
Thomas C. VanDegrift
By Blackmore, Spencer & Flint
Attorneys

Oct. 29, 1940.    T. C. VAN DEGRIFT    2,219,795
MASS CENTERING MACHINE
Filed March 31, 1937    16 Sheets-Sheet 7
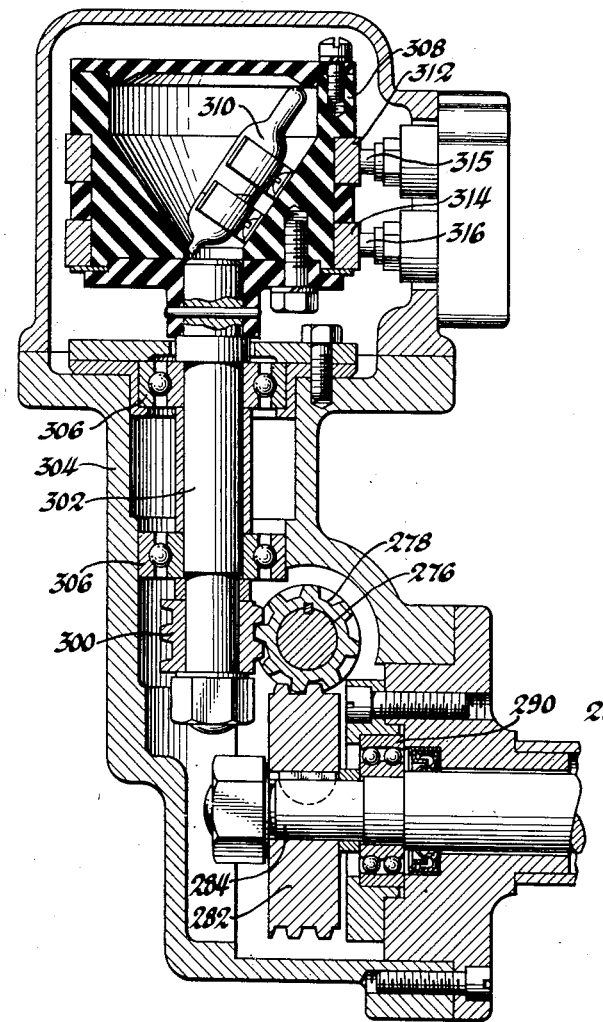
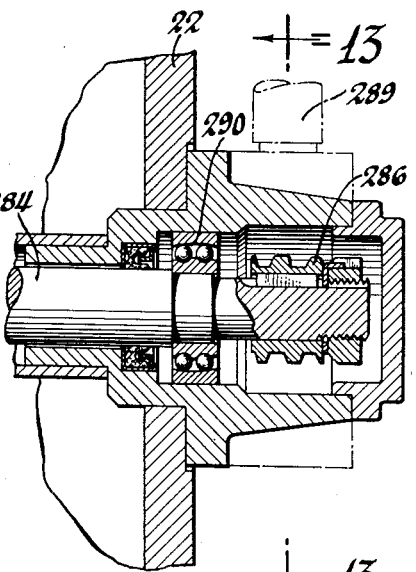
Fig. 12
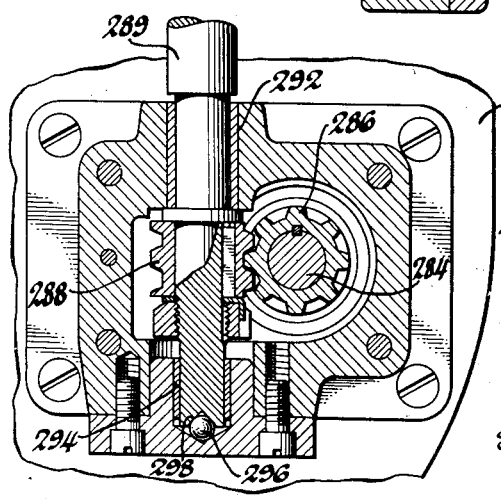
Fig. 13
Inventor
Thomas C. Van Degrift
By Blackmore, Spence & Flint
Attorneys Oct. 29, 1940.　　　T. C. VAN DEGRIFT　　　2,219,795
MASS CENTERING MACHINE
Filed March 31, 1937　　　16 Sheets-Sheet 9
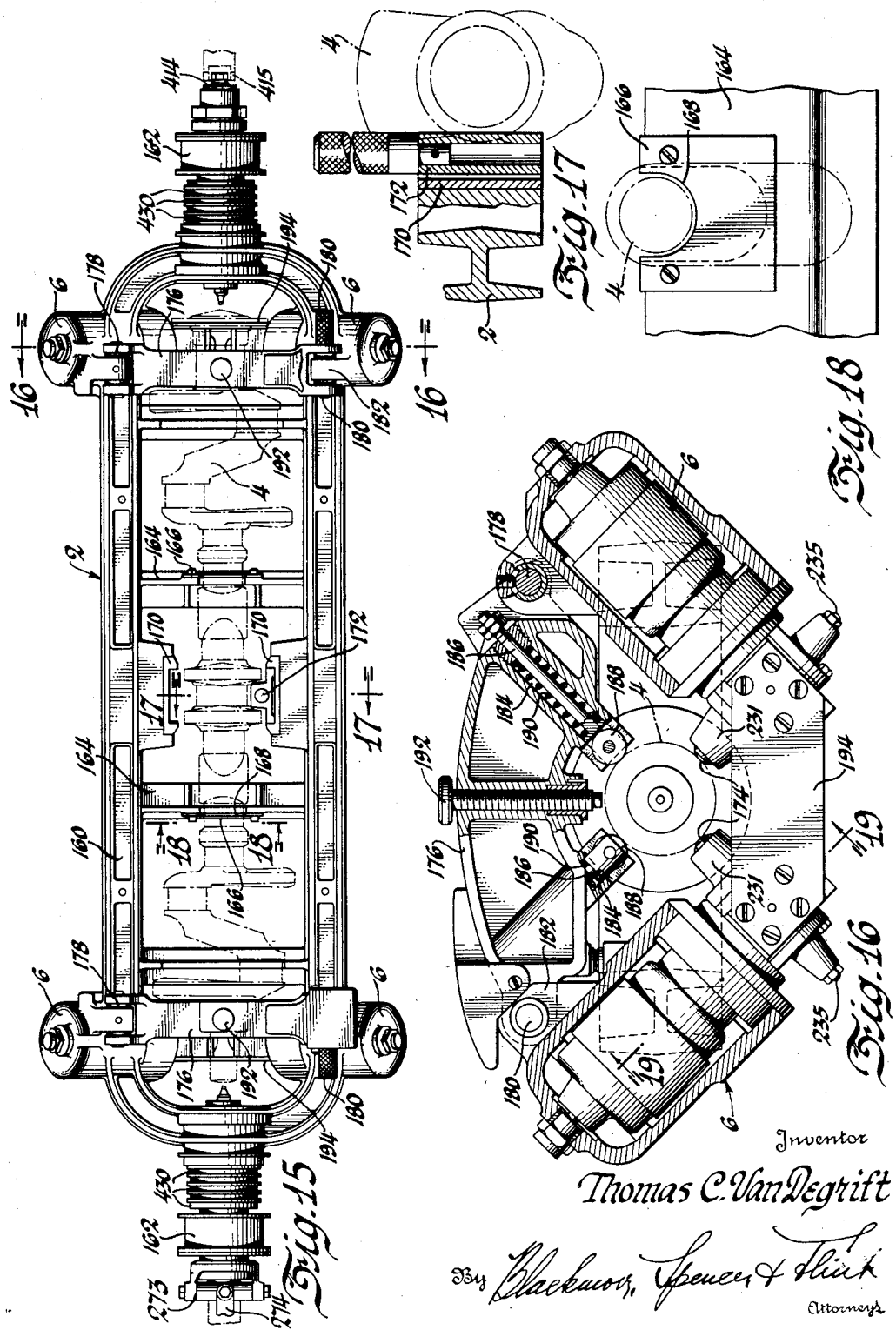
Inventor
Thomas C. Van Degrift
By Blackmore, Spencer & Flint
Attorneys Oct. 29, 1940.                T. C. VAN DEGRIFT                2,219,795
                             MASS CENTERING MACHINE
                      Filed March 31, 1937        16 Sheets-Sheet 10

Inventor
Thomas C. Van Degrift
By Blackmore, Spencer & Flint
Attorneys

Oct. 29, 1940.    T. C. VAN DEGRIFT    2,219,795
MASS CENTERING MACHINE
Filed March 31, 1937    16 Sheets-Sheet 12
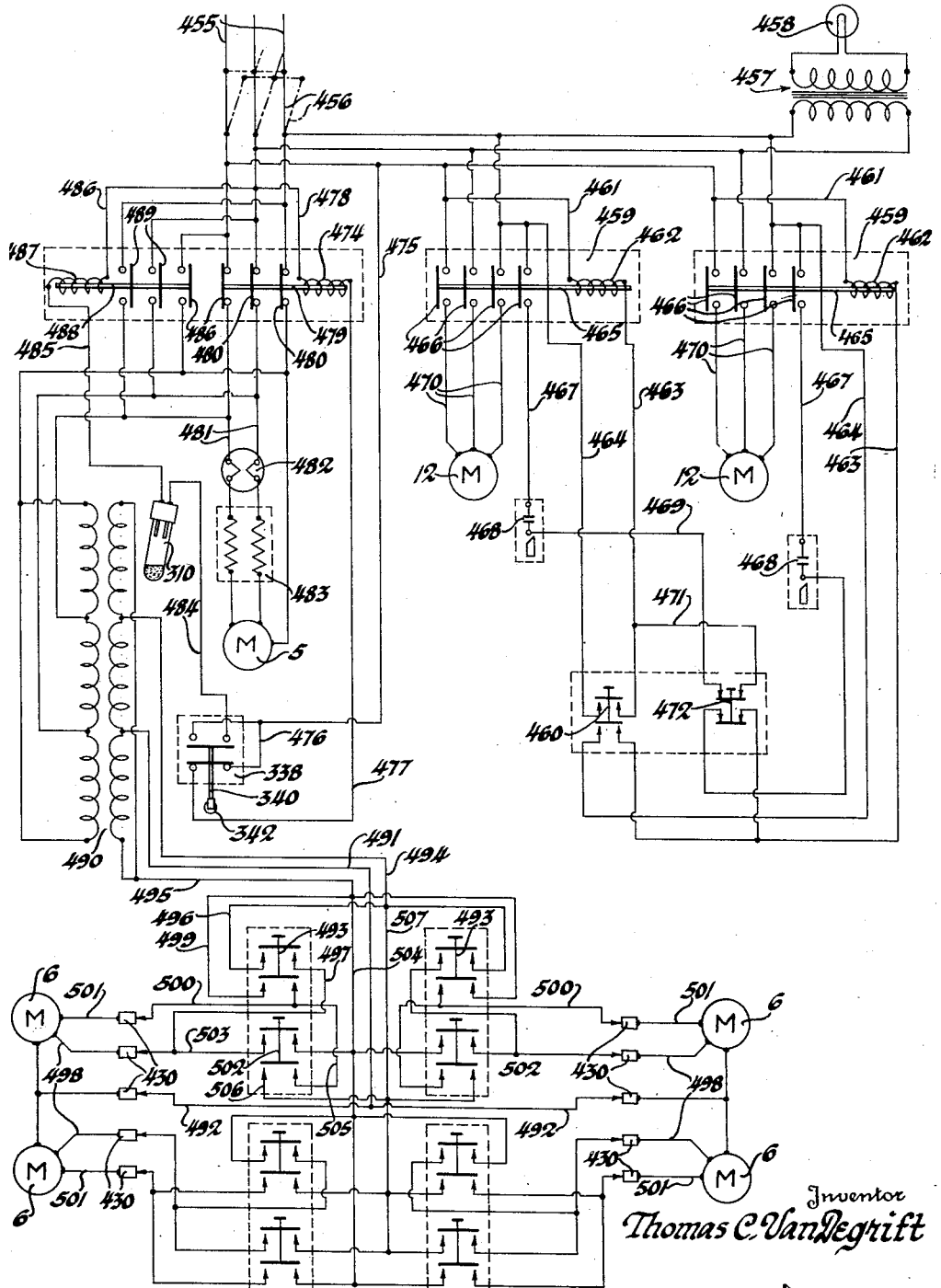
Fig. 23
Inventor
Thomas C. Van Degrift
By 
Attorneys Oct. 29, 1940.  T. C. VAN DEGRIFT  2,219,795
MASS CENTERING MACHINE
Filed March 31, 1937  16 Sheets-Sheet 13

Inventor
Thomas C. Van Degrift
By Bachauoz, Spencer & Flint
Attorneys

Oct. 29, 1940.  T. C. VAN DEGRIFT  2,219,795
MASS CENTERING MACHINE
Filed March 31, 1937  16 Sheets-Sheet 14

Inventor
Thomas C. Van Degrift
By Blackmore, Spence & Hurd
Attorneys

Oct. 29, 1940. T. C. VAN DEGRIFT 2,219,795
MASS CENTERING MACHINE
Filed March 31, 1937 16 Sheets-Sheet 15

Inventor
Thomas C. Van Degrift
By Blackmore, Spencer & Flint
Attorneys

Inventor
Thomas C. Van Degrift
By Blackmore, Spencer & Flint
Attorneys

Patented Oct. 29, 1940

2,219,795

UNITED STATES PATENT OFFICE 2,219,795

MASS CENTERING MACHINE

Thomas C. Van Degrift, Detroit, Mich., assignor to General Motors Corporation, Detroit, Mich., a corporation of Delaware Application March 31, 1937, Serial No. 133,994

17 Claims. (Cl. 73—53)

This invention relates to balancing and more particularly to a machine for determining the axis of rotating balance or the mass center of rotating bodies, such as crankshafts and the like.

In my prior Patent 1,761,945, dated June 3, 1930, I have illustrated and described a method and apparatus for centering a rough crankshaft forging on its axis of rotating balance, instead of along an axis determined by surface symmetry as was common in the art. When the axis of rotating balance is thus determined, the ends of the crankshaft are drilled along this axis and all machining of the shaft is performed while the shaft is held upon this line of centers. By selecting the center line in this way, it is found that the machined crankshaft has a low degree of unbalance and may be within the allowable manufacturing limits. If not within allowable limits, the shaft may be easily balanced by removing a small amount of metal. While the method and apparatus disclosed in the patent has many advantages it is necessary to start and stop the machine a number of times to shift the forging to the center position. In the method and apparatus comprising the subject matter of this invention, the mass axis of the shaft is located while the shaft is being rotated. Obviously, production is greatly increased over that of the prior art devices.

The specific embodiment of my invention shown in the drawings comprises a substantially perfectly balanced cradle unit mounted flexibly in horizontal position and rotated by means of an electric motor connected to one end of the cradle by means of a universal joint. Mounted on the cradle and forming a portion of the cradle unit are electric motors which, through suitable speed reducing means, drive positioning rollers adapted to shift the crankshaft within the cradle. An optical indicating means is provided to indicate the balance characteristics of the shaft. If found out of balance, the operator can readily shift the shaft within the cradle while the cradle is rotating, by means of the motors and positioning rollers. By thus shifting the shaft while it is rotating a great saving in time and labor results. In fact, the production on machines of the type described in this specification is approximately twice, or even more than twice, that of old type machines. After the shaft has been accurately centered, the center drill holes from which all future machine work will be located may be drilled before the forging is removed from the cradle. The device also comprises controls adapted to facilitate the results set forth above.

The principal object of my invention is to provide a machine for speedily and accurately locating the axis of rotating balance or the mass axis of a rotating body.

Another object of my invention is to provide an apparatus for rapidly locating the mass center of a rotating shaft and for drilling the ends thereof.

A further object of my invention is to provide a mass centering machine which comprises a substantially perfectly balanced cradle unit and means for shifting work within the cradle while the cradle and work are being rotated.

Still another object of my invention is to provide a means whereby the ends of the shaft may be drilled in line with its mass axis without removing the shaft from the machine.

It is also an object of my invention to provide a control system for the several motors whereby the operation thereof may be readily controlled.

A still further object of my invention is to provide a cradle adjusting means whereby shafts of different lengths may be rapidly centered.

Other objects and advantages of my invention will become more apparent as the description proceeds. Reference is herein made to the accompanying drawings, forming a portion of this specification, in which two embodiments of my invention are disclosed.

Figure 2 is a longitudinal sectional view taken substantially on the line 2—2 in Figure 3.

Figure 3 is an elevational view with parts in section taken on line 3—3 in Figure 1.

Figure 4 is a detail sectional view taken on line 4—4 in Figure 3.

Figure 5 is a view on line 5—5 in Figure 4.

Figure 6 is a diagrammatic view showing a revolving mirror adapted to throw a beam of light onto a chart to indicate balance characteristics of the rotating shaft.

Figure 12 is a sectional view on line 12—12 in Figure 11.

Figure 13 is a sectional view on line 13—13 in Figure 12, showing the driving means for the revolving mirror.

Figure 15 is a plan view of the cradle and crankshaft centering means.

Figure 16 is a sectional view on line 16—16 in Figure 15 showing motor driven rollers adapted to move one end of the crankshaft to accurately position the same in the cradle.

Figure 17 is a detail sectional view on line 17—17 in Figure 15 showing a means to locate the crankshaft during the operation of placing the same in the cradle.

Figure 18 is a detail view on line 18—18 in Figure 15 showing a support for a crankshaft during the loading and unloading operation.

Figure 23 is a wiring diagram of a control circuit that may be used for controlling the several motors.

*General description*

Figure 1:
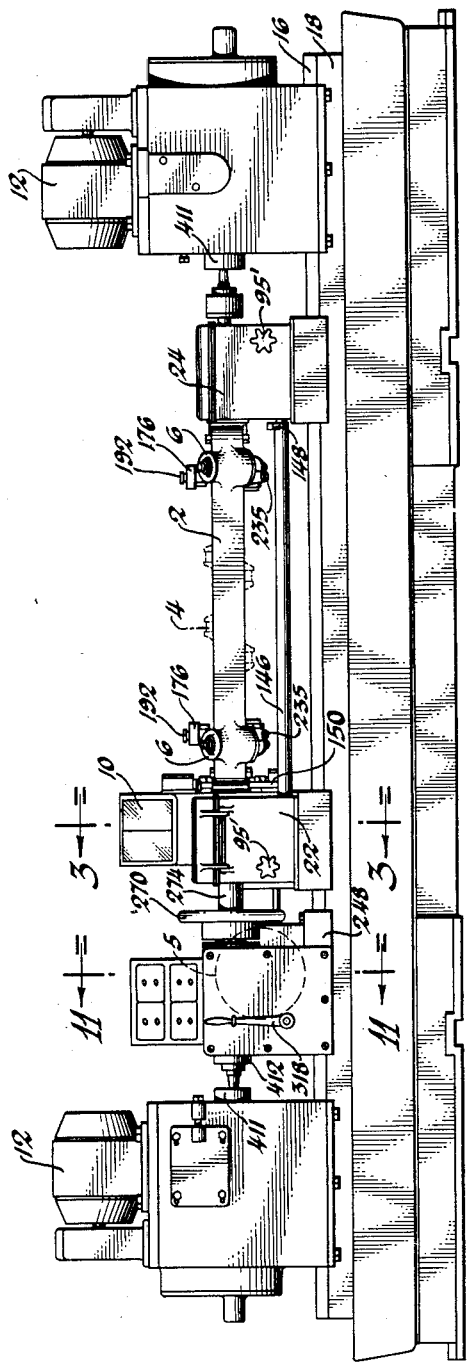
Figure 1 is an elevational view of the complete machine.

The balancing machine of one embodiment of my invention shown in the drawings comprises a horizontally disposed substantially perfectly balanced cradle, indicated generally at 2, within which is mounted a crankshaft 4. The cradle and crankshaft therein are rotated by means of a motor 5. Two motors 6, are mounted at either end of the cradle, rotate therewith, and are adapted to drive rollers which locate the ends of the crankshaft while the cradle is rotating. A screen 10 is provided in which the direction and amount of unbalance will be indicated by means of a revolving mirror and source of light. Thereupon the operator may operate the controls for the motors 6, 6 and move the ends of the shaft until the shaft is in balance and locate the mass center thereof. After the mass center has been determined the crankshaft may be fixed in position and the ends thereof bored by means of drills driven by motors 12. The cradle and motors are adjustably mounted on ways 16, which in turn are mounted on the bed 18.

*Cradle end supports*

The ends of the cradle are flexibly supported by similar mechanisms contained in enclosing casings 22 and 24. A detailed description of one supporting mechanism will serve also as a description of the other. In Figures 2 and 3 an arm member 26, having a two-part trunnion portion 28 at one end embracing the end of the cradle, has its opposite end pivoted at 29 to the upper end of an upright member 30. The latter has its lower end pivoted at 31 to the base portion 32 of the casing 22. Coiled springs 34 and 36 on the right and left sides, respectively, of the upright member engage seats 38 and 40, respectively, formed in said member. The opposite end of the spring 34 engages a seat 42 formed on a member 44 having threaded engagement at 45 with a member 46 fixed to the base portion 32. A lock nut 47 on the end of member 44 locks the latter in position. Pivoted at 50 to the member 46 is an arm 51 having a yoke portion 52 at one end and having its opposite end pivotally connected at 53 to one end of a generally horizontally disposed rod 54. The yoke portion surrounds a cylinder 56, which preferably is an air cylinder, and is pivotally connected at 58 thereto. Piston 59 in the air cylinder is connected by rod 60 and pin 62 to one end of an upright arm 64 pivoted at 66 to the base portion 32. The opposite end of arm 64 has a rack portion 68 engaging a sector gear 70. The sector gear has a locking portion 71 which engages a portion 72 of the upright member 30 to lock the upright against movement to the right during the crankshaft loading and drilling operations as shown in Figures 3, 4 and 5. Movement of the rack portion to the right, as viewed in these figures, will pivotally move the sector gear and locking portion thereof counterclockwise and allow the upright to be held in a resilient manner by the action of coil springs on either side thereof. A flat portion 73 of the sector gear engages a fixed portion 74 of the frame and acts as a stop member for limiting movement of the gear in a clockwise direction, as viewed in Figure 5. A bent arm 75 secured to the upright has connected thereto, by means of a universal joint 76, a rod 77 secured to a piston 78 in a cylinder 79 secured to the casing. A screw threaded plug 80, having an opening 81 therein, is fitted to the end of the cylinder, the size of the opening being controlled by means of a screw threaded needle valve 82, as will be readily understood from Figure 3 of the drawings. The piston and cylinder constitute a dash pot for damping movement of the upright when the cradle is in unlocked position.

As viewed in Figure 3, the left hand end of the coiled spring 36 engages a seat 85 formed on one end of a stem 86 having a threaded portion 87 on the opposite end thereof. The threaded portion of the stem is screwed into the upper end of an arm 88 and is secured in position by means of a lock nut 89. By means of the described construction the lock nut may be loosened and the stem and seat rotated to a new position to vary the tension of the coil spring, whereupon the lock nut may be tightened to maintain the adjustment. The lower end of the arm 88 is keyed to a pivot pin 90. The latter is supported by raised portions 91 of the base 32. Also, keyed to the pin is another arm 92 pivotally connected at 93 with a coupling 94 having an internally threaded end portion 94'. A rod 95 has a knob 95' fixed to one end externally of the casing and a threaded end portion 96' engaging the threaded portion 94'. Spaced collars 97' fixed to rod 95 engage on either side of an upright 98'. The rod is thus fixed against movement in an axial direction and rotation of the rod by means of the knob 95' will move members 94 and 92 to further vary the length of the coil spring 36.

A cylindrical extension 96 of the lower part of the trunnion 28 has a coil spring 97 surrounding the same, one end of which engages an annular groove 98 formed in the lower surface of the trunnion and the other end of which engages a collar 99. The collar is adjustable to vary the compression of the coil spring by means of threaded collar members 100 and 102. The threaded collar members engage a threaded tubular extension 104 of an upright member 106 secured to the base by means of the nut 108. Within the cylindrical extension 96 is a piston 110 connected by means of rod 112 and universal joint 113 to a second rod 114 extending through the upright member 106 and secured thereto by a nut 115. A groove 116 formed in the trunnion above the piston has an adjustable needle valve 118 extending therein to control flow of air into and out of the cylinder above the piston. The cylinder and piston constitutes a dash pot for damping movement of the cradle.

The opposite end of rod 54 is pivotally connected at 120 to an upright arm 122 pivotally connected at 124 to the base portion 32 of the casing. A coil spring 126, mounted between the base of the machine and an extension 128 of the upright, tends to move the upright 122 about the pivot 124 toward an adjustable limiting stop 125. Near the upper end of the arm 122 is a generally frusto-conical hollowed out portion 130 adapted to cooperate with a generally frusto-conical projection 132 formed on the trunnion. The air cylinder 56 is adapted to move the rod 54 to lock the trunnion in place during the operation of loading a crankshaft into the machine and during the drilling operation. The supporting mechanism for the opposite end of the cradle is similar to that just described and the description of the mechanism given will suffice for both. For simplicity of description the two knob members 95' have been shown, one at each casing 22 and 24. If desired, for convenience of the operator of the machine, both may be mounted in the left hand casing 22 and an extension leading to the other cradle end provided. It will be understood that the supporting mechanism comprises resilient supporting means for the two opposite cradle ends during the operation of determining the mass center and means for locking the ends against movement during the operation of loading the crankshaft forging, or other article. It will be appreciated that the crankshaft forging may weigh as much as 175 pounds, or even more, and it is desirable to have a means to substantially rigidly support the cradle while the shaft is being inserted therein, as well as during the steps of drilling the two ends of the shaft at the mass center thereof.

Indicating means and operating means therefor

Since the cradle is substantially perfectly balanced to begin with, any unbalance shown on the indicator chart will be due to unbalance of the crankshaft forging. Rotation of the cradle with the crankshaft therein will cause the two to assume a position determined by the amount and direction, or plane, of the unbalance in the shaft. The flexibly mounted upright member 30 has fixed to a point at the top thereof an arm 134, see Figures 2 and 3, which is adapted to move a pivoted shaft 136 having a mirror 138 fixed thereto. A suitable coil, or other, spring 139 is adapted to bear against a portion of the shaft to force the same against the end of the arm 134. It will be seen, therefore, that as the flexibly mounted upright 30 assumes a position determined by the unbalance of the crankshaft within the cradle it will move the arm 134, which in turn will rotate the shaft having the mirror fixed thereto against the compression of spring 139. The greater the movement of the upright, which increases with the degree of unbalance, the greater the tilting movement of mirror 138. Light rays from a lamp bulb 140, see Figures 3 and 6, are adapted to strike the mirror and be reflected against a rapidly revolving mirror 142, which in turn projects the rays against a screen 10 to indicate the amount and direction of unbalance at one end of the shaft.

The means for determining the unbalance at the right hand flexible support, as viewed in Figure 2, is generally similar to that just described. In order for the readings to be made for the two ends at the same point, a member 144 is secured to the right hand upright 30, as viewed in Figure 2, to be moved therewith through an arc as determined by the amount of unbalance. A tubular member 146 is secured to one end of the member 144 by means of a clamping means 148. Thus, movement of the member 144 will cause the tubular member 146 to move therewith. At the left hand end of the tube 146, adjacent the left hand casing, or housing, is an upright tubular member 150, to the upper end of which is secured an arm 152 adapted to operate a tiltable mirror 154 against a spring 156. The operation of the mirror 154 is generally similar to that of mirror 138 and the description of mirror 138 will suffice for both. Adjacent the upright tube 150 is a bearing support, generally indicated at 158, for tube 146. The indicating means is generally similar to that described in my Patent 1,761,945, dated June 3, 1930. Any other suitable indicating means may be used, if desired.

Cradle mechanism

The substantially perfectly balanced cradle generally indicated in Figure 1 of the drawings at 2, comprises, see Figure 15, a supporting frame 160, having bearing portions 162 at each end adapted to cooperate with the trunnions 28 of the arms 26. Cross members 164 are provided which reinforce the cradle frame and act as supports for adjustable members 166, see also Figure 18, having arcuate openings 168 in the upper end thereof on which the crankshaft may rest during loading and unloading from the cradle. It will be understood that the openings 168 are of such depth as not to interfere with the movement of the crankshaft during movement of the same in determining the mass center. At substantially the central portion of the frame of the cradle are hardened members 170 within which a movable means 172 is adapted to slide to locate the crankshaft axially before the cradle is rotated to determine the mass center of the crankshaft. Member 172 will be withdrawn after the shaft is properly located in an axial direction and before the cradle is rotated.

Fixed to the frame of the cradle adjacent each end thereof are two motors adapted to drive positioning rollers 174 which move the crankshaft within the cradle while the cradle is being rotated. The motors are generally similar and are indicated at 6 in the drawings, see Figures 1, 15 and 16. At each end of the cradle, vertically adjacent the positioning rollers, is a member 176 hinged at 178 to a portion of the cradle frame at one end and secured by means of a slidable locking bolt 180 to a projection 182 of the motor housing. It will be understood that the bolt 180 may be moved in an axial direction so that the hinged members may be thrown back while the crankshafts are being placed and removed from the cradle. Mounted in two openings 184 formed in each hinged member are two threaded rod members 186 having rollers 188 rotatably mounted at the lower ends thereof. Surrounding a portion of each rod member is a coil spring 190 adapted to force the rod and roller carried thereby in a direction generally radially toward the center of the cradle. Located in a vertical direction in each hinged member is a screw threaded adjustable stop member 192. By providing coil springs 190 of suitable stiffness the members 192 may be omitted, if desired. Suitable supporting plates 194, see Figure 16, may be provided, if desired, to more rigidly connect the motor frames at each end of the cradle.

Figure 19:
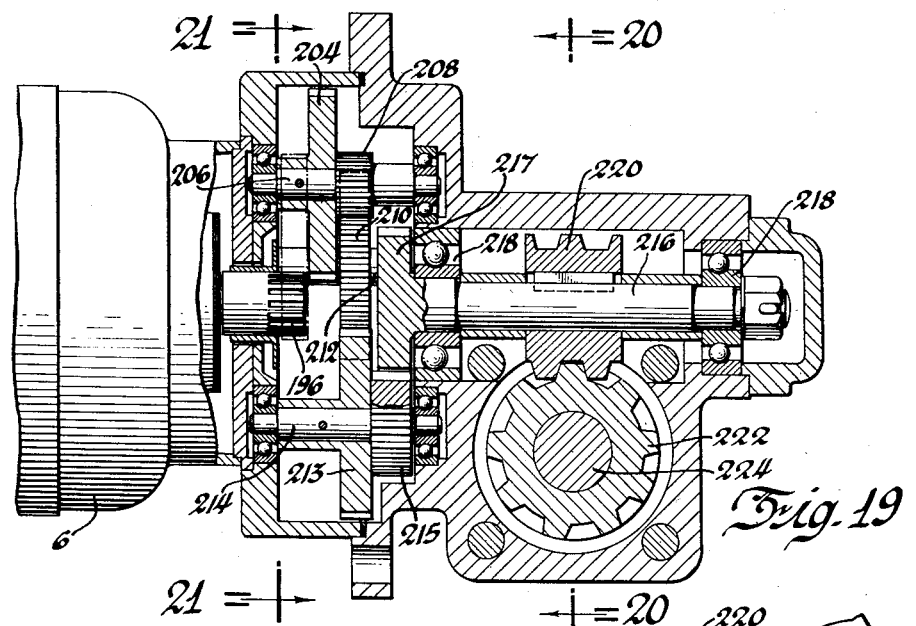
Figure 19 is a sectional view taken on line 19—19 in Figure 16 showing the means for driving the positioning rollers which move one end of the crankshaft.
Figure 20:
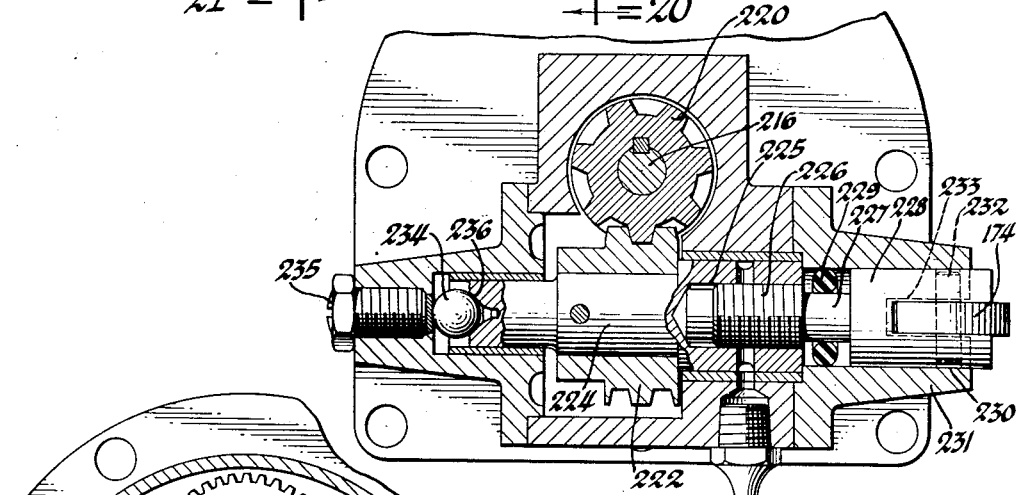
Figure 20 is a detail sectional view on line 20—20 in Figure 19.
Figure 21:
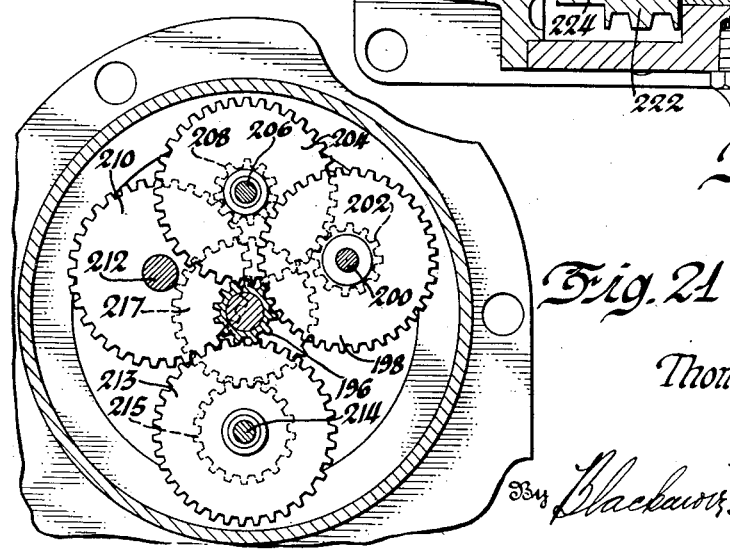
Figure 21 is a sectional view on line 21—21 in Figure 19 showing a gear reduction means.

The means whereby the positioning rollers 174 may be driven by the four motors will now be described. The drive from each of the four motors is the same and a description of one will serve as a description for the others. Referring especially to Figures 19, 20 and 21, a pinion 196 fixed to the motor shaft meshes with a gear 198 having a larger number of teeth than the pinion 196. Fixed to the shaft 200 on which the gear 198 is fixed and adapted to be driven therewith is a pinion 202 which in turn drives a gear 204 fixed to a shaft 206 to which is also fixed a pinion 208. The latter drives a gear 210 fixed to a shaft 212. Gear 210 drives a gear 213 secured to a shaft 214. A pinion 215 fixed to the shaft 214 drives a gear 217 fixed to a shaft 216 supported by bearings 218 at either end thereof. Substantially midway of the shaft between the bearings is a gear 220 keyed to said shaft which drives a gear 222 secured to shaft 224.

One end of the latter has a threaded bore 225 within which is the threaded end 226 of a supporting shaft 227. The opposite end of the shaft 227 has an enlarged portion 228 slidable in a bore 230 formed in a fixed frame member 231. A positioning roller 174 is rotatably mounted by a pin 232 in the enlarged portion of the shaft 227. The roller 174 is larger than the bore 230 and slides within a slot 233 formed in the member 231, thus permitting the shaft 227 to move axially within the bore while preventing the shaft from rotating. A suitable ball type thrust bearing 234, supported by means of an adjusting screw 235, is mounted within a conical opening 236 in the end of the shaft 224. Between the enlargement 228 and the end of the shaft 224 is a rubber packing ring 229. The gearing described above is adapted to reduce the speed of rotation of shaft 224 an appreciable amount as compared with that of a driving motor. Since shaft 227 is held against rotation, the rotation of shaft 224 will cause the screw threads on the latter to move the shaft 227 in an axial direction. The roller 174 carried thereby contacts the end of the crankshaft and moves it with respect to the cradle. The four motors are each reversible and hence the positioning rollers may be moved in either direction. The circuits to the several motors will be fully described in connection with the description of the electrical controls. The several motors, positioning rollers, driving means therefor, hinged members and rollers mounted therein constitute parts of the substantially perfectly balanced cradle unit.

Cradle rotating means

Figure 11:
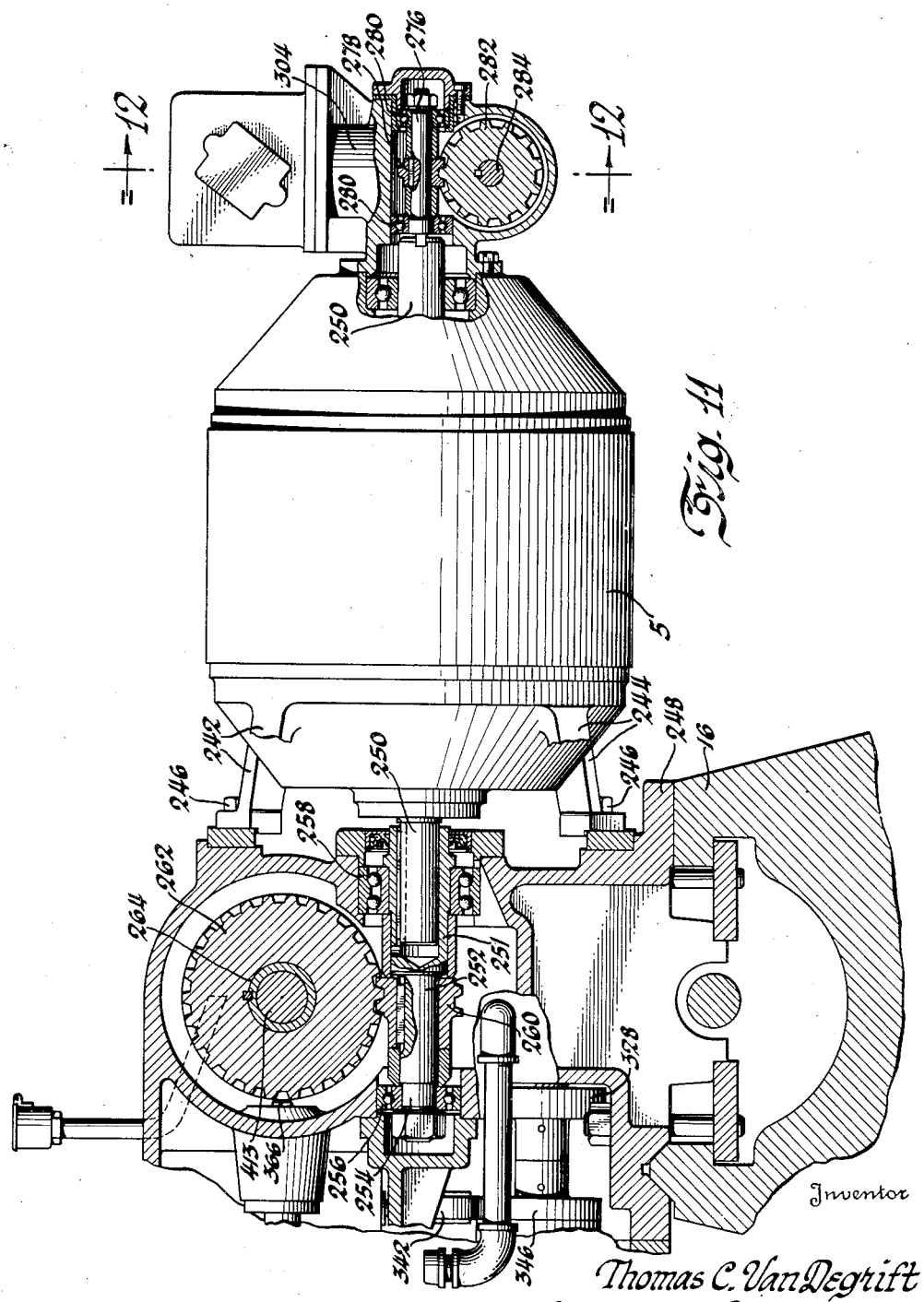
Figure 11 is a sectional view on line 11—11 in Figure 9 showing the motor drive for rotating the cradle and crankshaft therein.

Referring to Figures 1, 9 and 11, 5 indicates a motor suitably secured, as by means of brackets 242 and 244 and bolts 246, to a support 248 adjustably fixed to the base of the machine. One end of the motor shaft 250 extends into the sleeved-end portion 251 of a shaft 252 and is keyed thereto as seen in Figure 11. The opposite end 254 of the shaft 252 is rotatably supported by means of a ball bearing 256, while the sleeve portion is supported by means of another ball bearing 258. Keyed to the shaft is a worm 260 in mesh with a worm gear 262. The latter is keyed to a tubular shaft 264 supported adjacent its ends by means of ball bearings 266 and 268. A handwheel 270 is keyed to the shaft 264 at the end adjacent the left hand cradle end as viewed in Figure 1. By means of a universal joint 272, sleeve member 274 and universal joint 273, the handwheel and sleeve are joined to the left hand end of the cradle to impart rotation thereto from the motor shaft 250.

In addition to supplying the power for rotating the cradle, the motor 5 also causes rotation of the revolving mirror of the indicating means which throws the beam of light onto the chart. Referring to Figures 1, 2, 3, 11, 12 and 13, the opposite end of the motor shaft from that which drives the cradle is connected to and rotates a smaller shaft 276 having a gear 278 keyed thereon. The shaft is rotatably supported by ball bearings 280 at either end thereof. Gear 278 drives a gear 282 keyed near one end of a shaft 284 at right angles to the shaft 276. At its opposite end the shaft 284 has a gear 286 keyed thereto which engages a gear 288 keyed to a vertically extending shaft 289 which is connected by suitable gearing to the mechanism for revolving the mirror. Suitable ball bearings 290 adjacent either end of shaft 284 rotatably support the same. Bearings 292 and 294 adjacent the gear 288 support the end of the shaft 289 for rotation while a ball bearing 296 in a conical opening 298 in the end of the shaft resists end thrust on said shaft.

Referring to Figures 11 and 12, it will be seen that gear 278 engages a gear 300 fixed near one end of a shaft 302. The latter is mounted for rotation in a hollow frame 304 by means of suitable bearings 306. The shaft has secured to the upper end portion thereof, as viewed in Figure 12, a hollow member 308 formed of any suitable non-conductor of electricity. Within the hollow member is an inclined mercury switch 310 having leads connected to upper and lower slip rings 312 and 314, respectively. Brushes 315 and 316 contact the slip rings and form therewith a portion of an electrical circuit. The switch 310 rotates with the cradle motor and at a desired speed of rotation the mercury in the mercury switch will complete an electrical circuit which includes the slip rings and brushes as will be described more fully in connection with the electrical controls.

Control means for air cylinders and cradle locking means

Figure 7:
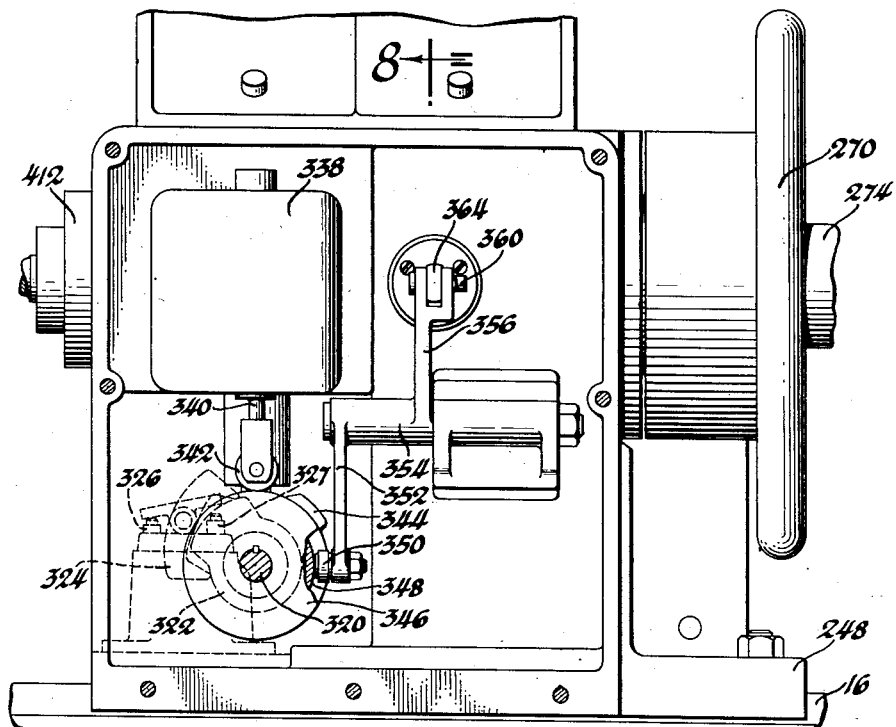
Figure 7 is a view showing means for operating a locking mechanism and an air valve control mechanism for air cylinders adapted to secure the cradle and shaft in position for drilling the latter, said air valve control and locking mechanisms being in unlocked position.
Figure 8:
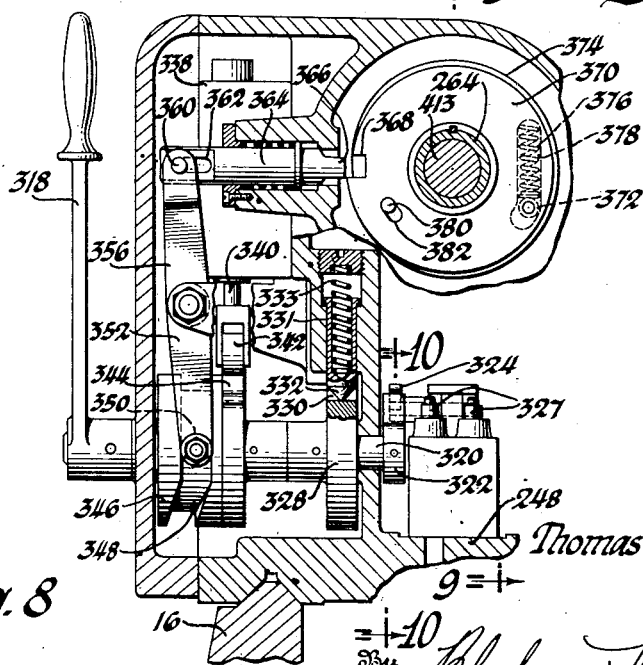
Figure 8 is a sectional view on line 8—8 in Figure 7.
Figure 9:
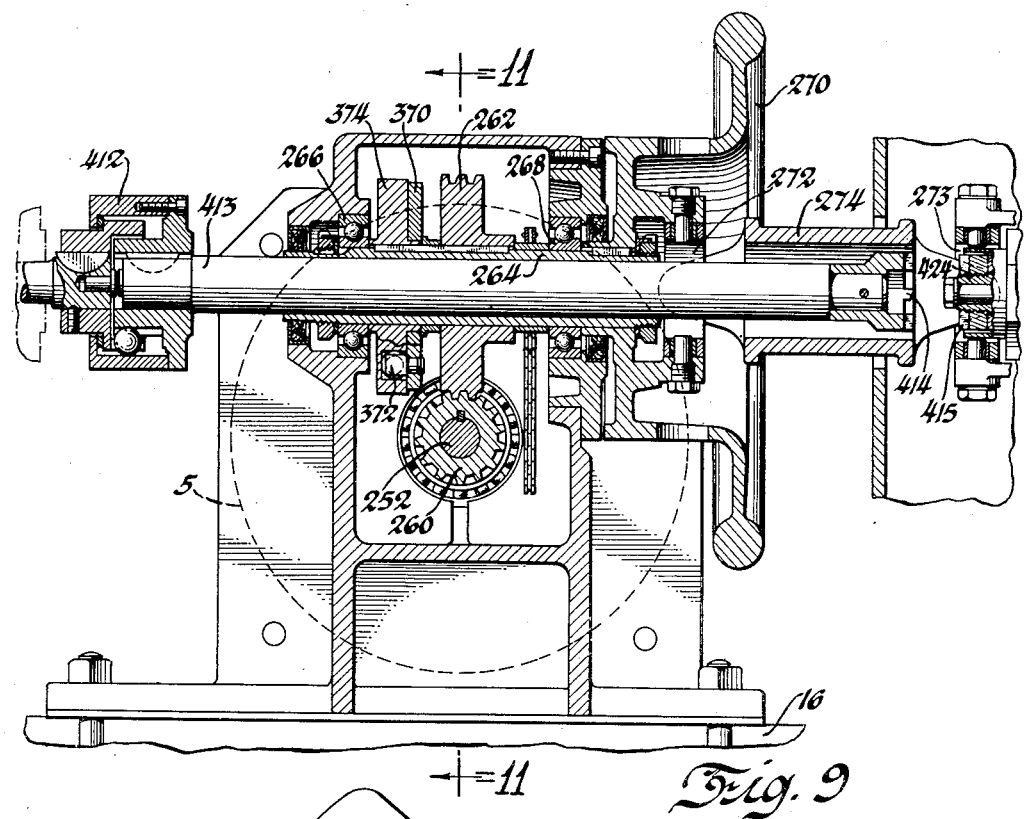
Figure 9 is a longitudinal sectional view taken on line 9—9 in Figure 8.
Figure 10:
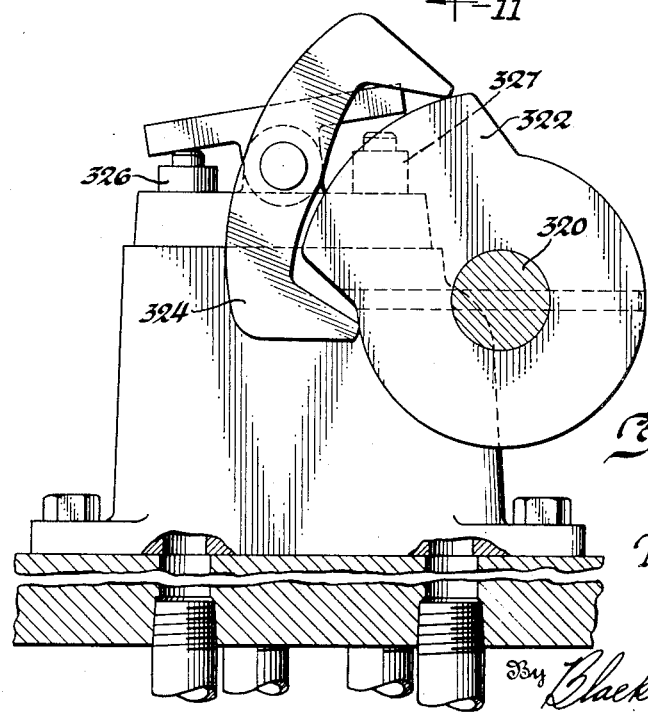
Figure 10 is a view on line 10—10 in Figure 8 showing the control cam for the air valves which operate devices for locking the cradle in position with the control cam in unlocked position.

The means for controlling the admission and exhaust of air from the air cylinders in order to lock and unlock the cradle during the loading and drilling operations will now be described. Referring to Figures 1, 2, 3, 7, 8, 9, 10, 14 and 22 in which the air cylinders and controls are shown, it will be seen that the hand lever 318 is fixed to a shaft 320 having a cam 322 fixed to the rear end thereof. The cam is adapted to contact a rocking member 324 connected to spring plungers 326 and 327 which connect a source of compressed air with either side of the pistons in the air cylinders to lock or unlock the means which supports the cradle ends in fixed position. In Figures 7, 8, and 10 the cam has moved the member 326 to a position which admits air to the right hand end of the cylinder 59, as viewed in Figure 3. This has caused the pistons and cylinders to move from the locked position of Figure 3 into unlocked position whereby the cradle and crankshaft therein may be resiliently supported during rotation thereof.

Fixed to the shaft 320 is a disc 328 having notches 330 in the periphery thereof. A hollow slidable member 331 having a conical end 332 is forced into contact with the periphery of the disc 328 by means of a coil spring 333. The notches and slidable member cooperate to hold the hand lever in position. Upon movement of the lever by the operator the spring will compress and permit the conical end portion to slide up the side of the notch and then slide on the periphery of the disc to a new position.

A member 346, having a cam groove 348 therein, is secured to the shaft operated by the hand lever. Within the groove is a roller 350 secured to one arm 352 of a bell crank 354, the opposite arm 356 of which has one end connected by means of a pin 360 to a slot 362 in one end of a member 364, the slot being of sufficient length to provide a lost motion connection between the bell crank and member 364. The opposite end 366 of member 364 may be moved to engage within a notch 368 in the periphery of a disc 370 loosely mounted on the tubular shaft 264 which rotates the cradle, as best seen in Figures 8 and 9. When the end of member 364 is within the notch the cradle cannot be rotated. Secured to the disc 370 is a member 372 projecting into an opening in a second disc 374 fixed to the rotatable tubular shaft 264. A coil spring 376 fitting within the opening 378 and bearing against the end of member 372 which projects therein provides a resilient connection between the discs. A pin 380 fixed to the disc 374 fits in a slot 382 formed in the disc 370 and acts as a stop to limit relative movement of the two discs.

The member 346 has a cam 344 thereon adapted to contact a roller 342 connected to the plunger 340 of a switch 338. When the roller contacts the raised portion of the cam the switch 338 completes a circuit which includes the mercury switch 310. It will be sufficient at this time to state that the circuit completed when switch 338 is in its raised position reverses the circuits to the motor 5 and causes a braking action to rapidly bring the motor and cradle to a stop. The several circuits will be more fully described in connection with the description of the electrical controls.

After the cradle has been brought to a stop the lever 318 and cam 322 may be moved in a counterclockwise direction, as viewed in Figures 7 and 8, to move the air valve control into a position to admit air to the left hand end of the cylinder 56, as viewed in Figure 3, in order to lock the cradle. Movement of the lever also moves the locking member 364 into engagement with the notch 368 to prevent the cradle from being rotated.

Drilling means

Figure 14:
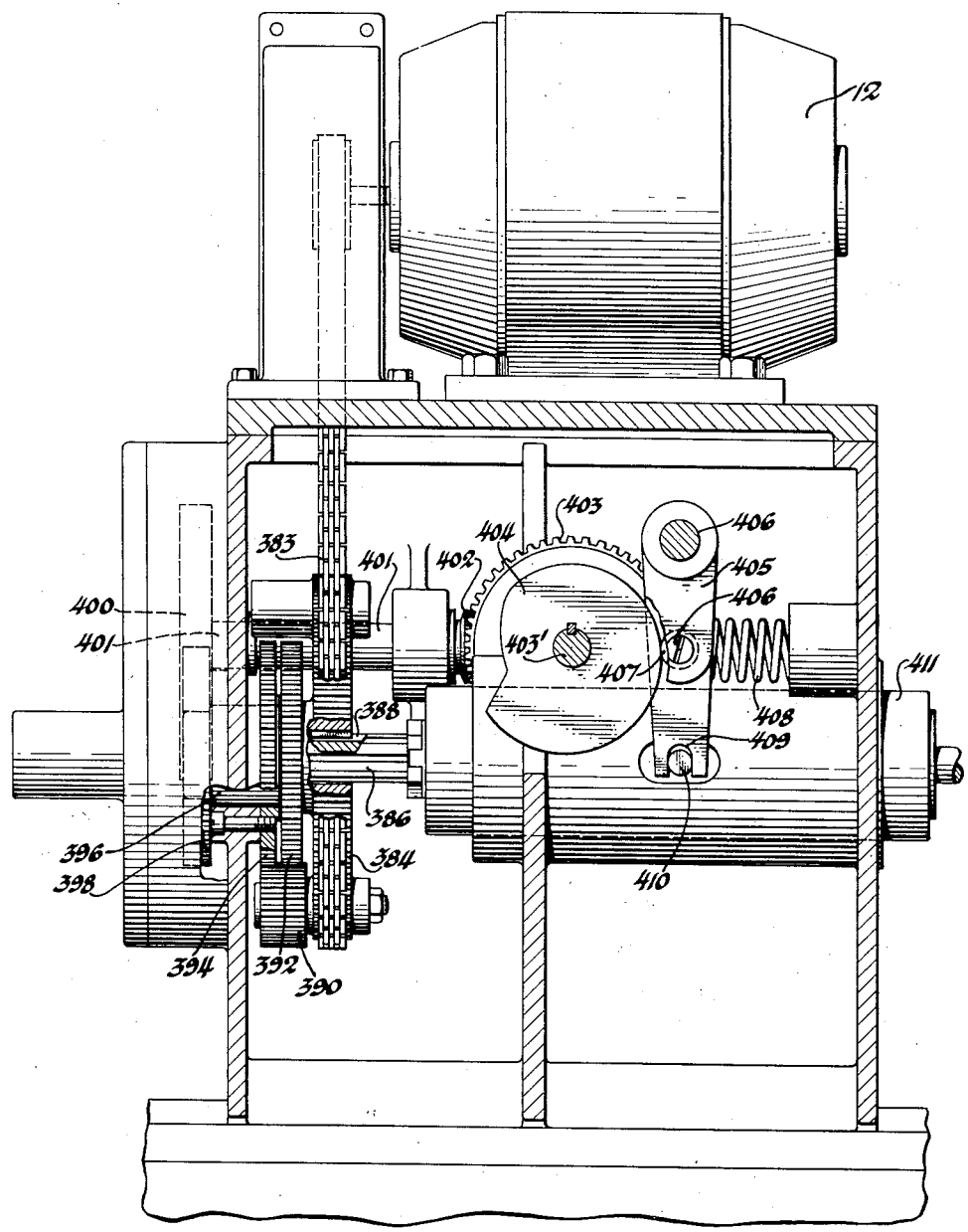
Figure 14 is a view of one of the end motors and the means for driving the drill.

The means for driving the drills which locate the center of rotation or mass center of the crankshaft are similar and a description of one will serve also as a description of the other. Referring especially to Figure 14, a motor 12 drives by means of a suitable chain 383 a large gear 384 splined at 388 to a shaft 386 whereby the latter may be rotated by means of gear 384 while the shaft is free to be moved axially thereof in order to move the drill into contact with the shaft end. Near the periphery of the large gear is secured a pinion 390 which drives gears 392 and 394. Gear 392 has one less tooth than has gear 394 and hence the pinion causes relative movement between the two. A sleeve 396 formed integral with gear 392 drives a gear 398 having a less number of teeth than a gear 400 driven thereby. The latter is fixed to and drives a shaft 401 having a pinion 402 secured thereto, which in turn drives a gear 403. The latter is fixed to a shaft 403' having a cam 404 keyed thereto. An arm 405 pivoted at 406 to the frame has a roller 407 secured thereto, the arm and roller being biased toward the cam by means of a coil spring 408. The opposite end of the arm has a notched end 409 which engages a pin 410 secured to sleeve 411 within which the shaft 386 rotates. It will be understood that the shaft 386 is rotated at a suitable speed for drilling and, by means of the speed reducing means just described, the cam causes the pivoted arm to reciprocate the shaft slowly to bring the drill into engagement with the end of the work at a desired point in the cycle of operation. The other end unit is similar to that just described and preferably is operated simultaneously therewith. The shaft 386 is connected by means of a connector 412 to one end of a spindle 413 mounted within the sleeve 264, see Figure 9. To the opposite end of the spindle is connected a member having clutch teeth 414 adapted to be moved into engagement with cooperating teeth 415 on one end of a drill rotating sleeve 424 within the cradle end; see Figure 22. Within the sleeve and secured thereto is a rod 416 having a screw threaded connection 417 with a collet 418 mounted within an enlarged opening in the sleeve. The collet engages a drill 419 for drilling the crankshaft end at the mass center thereof. The sleeve is moved to the right, as viewed in Figure 22, by the spindle 413 and moves the rod, collet and drill therewith. This compresses the spring 420 surrounding a portion of the sleeve. A thrust bearing 421 is provided between a portion of the sleeve and a collar 422 secured to a bearing 423 for the sleeve. Upon movement of spindle 413 to the left, as viewed in Figures 9 and 22, the compressed spring 420 will move the sleeve 424 and parts carried thereby to the left. In place of the means just described for driving the drills, any other equivalent means may be used, if desired; for example a hydraulic driving unit.

*Electrical controls*

Figure 22:
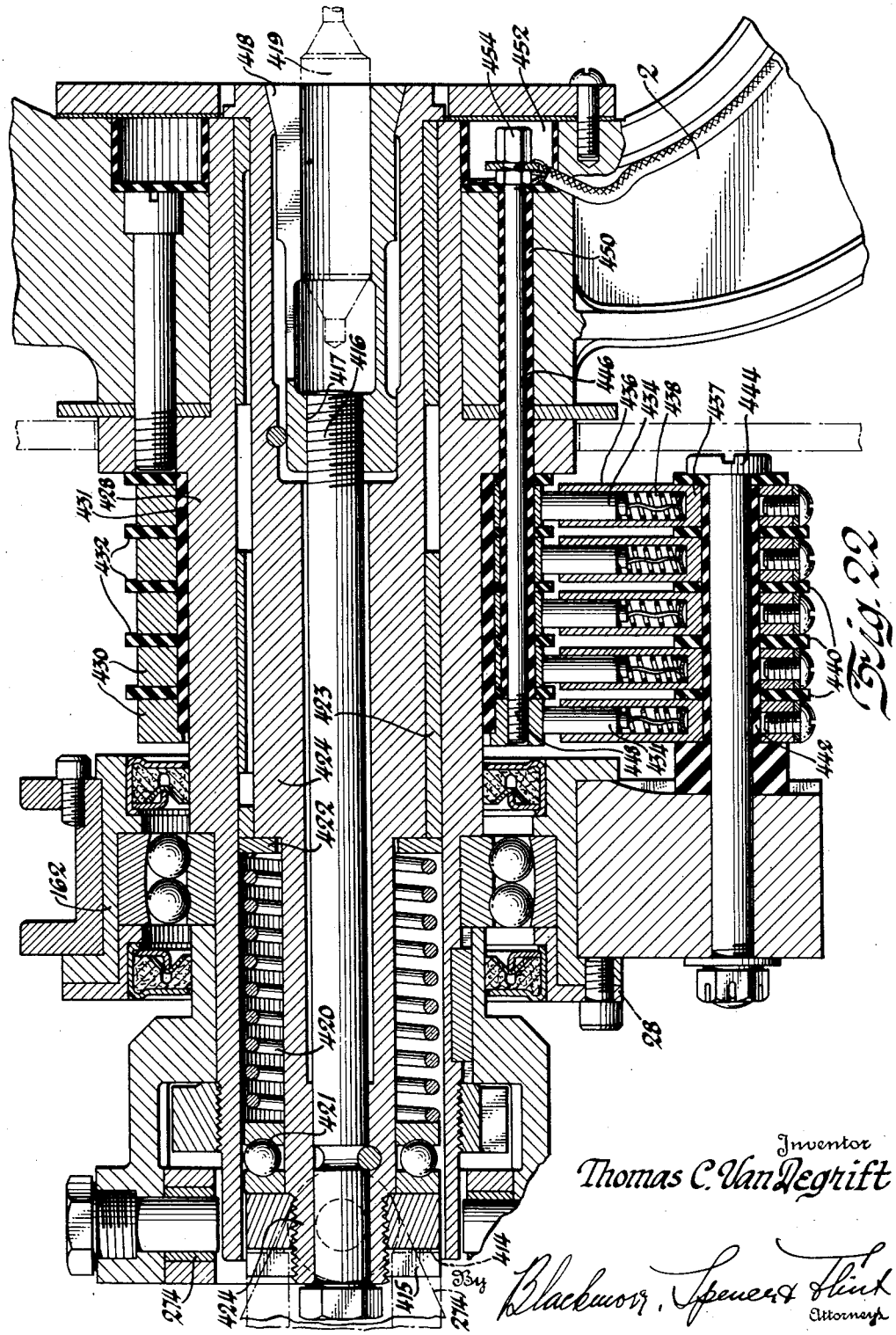
Figure 22 is an enlarged sectional view taken on line 22—22 in Figure 3 showing one end of the cradle with electrical controls applied thereto.

The electrical controls shown in Figures 3, 8, 9, 11, 12, 15, 22 and 23, are arranged to enable the operator to quickly manipulate the machine and move the crankshaft within the cradle until its mass center has been located; whereupon the cradle and shaft may be locked in position and the ends of the crankshaft drilled at the center of rotation. Referring especially to Figures 15, 22 and 23, it will be seen that slip rings 430 are provided at each end of the cradle which join the electrical connections leading to the two motors at each end of the cradle. Five of the slip rings are shown at each end of the cradle and are generally similar to each other. Between the sleeved-end portion 428 of the cradle and the slip rings is a sleeved member 431 formed of a suitable insulating material, as for example Bakelite, or hard rubber. The several slip rings are electrically insulated from each other by means of annular rings 432 formed of suitable insulating material. To each of the several slip rings is connected a suitable brush 434, which is formed of a suitable conducting material, as for example carbon. Each of the brushes is slidable within a sleeved portion 436 of a member 437 and is resiliently held in contact with a slip ring by means of a spring 438 fitted within the sleeve and bearing against one end of a brush. The members 437 are suitably insulated from each other by means of spacers 440 formed of any suitable non-conducting material. The several members 437 are electrically insulated from the machine by means of a sleeve 442, also formed of material which is a non-conductor for electricity. Within the sleeve is a bolt 444 which secures the several members 437 to the lower portion of the trunnion 28. To each of the members 437 is secured a conductor leading to the source of electrical energy for driving the several motors.

In Figure 22 of the drawings, a rod 446, having a screw threaded portion 448 joining the left hand slip ring, is electrically insulated from the cradle frame by means of a sleeve 450 formed of any suitable insulating material. The right hand end of rod 446 extends into an insulated annular channel portion 452 and acts as a binding post 454 for an electrical conductor leading to one of the cradle motors. The rod 446 is formed of any suitable conducting material. The other slip rings are connected by rods similar to the rod 446, but of progressively decreasing lengths, the rods being arranged in a circular series around the cradle end. From the wiring diagram, in Figure 23, it will be seen that one of the slip rings is common to each of an end pair of motor connections, while the other four are connected two to each end motor. The circuits leading to the other pair of end motors are generally similar to those just described and therefore the description need not be repeated. By means of the slip ring arrangement, current from an external source may be transmitted to the motors while the cradle is rotating.

Referring to Figure 23 of the drawings, a three-phase power circuit is indicated at 456. A switch 456 is adapted to connect the power circuit with connections to the several motors. A transformer 457 and indicator light 458 also are joined to the power circuit. The two motors 12 which drive the drills are connected to the line by means of the starting switches generally indicated at 459. The normally open start push button switch 460 is momentarily closed by the operator which completes the circuit 461, 462, 463 and 464. Circuit portion 462 is a coiled winding which energizes the armature 465 having contacts 466 carried thereby and moves the same to the right which completes the circuits 470 to the motors 12. The right hand contacts 466 in Figure 23 complete the circuits 467, 468, 469, 471, 463, 462 and 461 to maintain the energization of the coils 462 to thus hold the armatures 465 and contacts in closed position and keep the motors running, it being understood that the switch 460 is opened as soon as the motors are started. The cam operated switches 468 are opened at the end of the cycle of operation of drilling the crankshaft ends and stop the motors by breaking the circuit which includes the coil 462 which holds the motor switches closed. A normally closed switch 472 may be opened by the operator of the machine if desired to stop the motors 12 at any time. Opening of this switch will, of course, break the circuit which includes the coil 462 and thus break the motor circuit. Switch 472 will immediately close but since switch 460 is open the motors cannot be restarted without again closing switch 460.

The circuits for motor 5 which rotates the cradle are also shown in Figure 23. Switch 338 in the lower of its two positions completes the following circuit through the coil 474 from the power circuit; leads 475, 476, 477 and 478. Current passing through the coil energizes the same and holds the core 479 and the contacts 480 carried thereby in the position shown in Figure 23. Two of the motor leads 481 are connected to a snap switch 482 which completes the circuit to the motor through the resistance unit generally indicated at 483. This causes the cradle to rotate and the shaft is then centered therein. When the shaft is balanced the operator will move lever 318 to the left and move the cam 344 therewith. Movement of switch 338, by means of the plunger and roller actuated by cam 344, to the other of its two positions will break the circuit through the hold coil 474 and complete a circuit, 475, 484, 485, and 486 through the coil 487 when the mercury switch is in closed position. The mercury switch is closed by centrifugal force acting on the mercury in the inclined tube of the switch. Current through coil 487 energizes the same and pulls the core 488 to the left and forces contacts 489 to reverse the circuit to the motor. Since motor 5 is still rotating in the same direction, a braking action takes place which continues so long as the speed of rotation of the motor is sufficient to cause the mercury to be moved up the sides of the inclined rotating glass tube of the switch due to centrifugal force acting thereon.

Connected in the cradle motor circuit is a step down transformer 490, connected to the secondary of which are the leads for the four motors mounted on the cradle to move the crankshaft therein. The circuits to the four motors include leads and switches adapted to drive and reverse the several motors as desired by the operator. By means of the visible indication of the unbalance of the shaft the operator will know in which direction to move the crankshaft positioning rollers by means of the motors. The circuits to the four motors are generally similar and the description of one will serve as a description for the others. From the secondary of the transformer 490 is a lead 491 which joins a lead 492 to a slip ring 430 at one end of the cradle, this being the central slip ring which is common to both motors at either end, as indicated in Figure 23. By means of switch 493, a circuit to a motor is completed through the three slip rings therefor to rotate the motor and drive the crankshaft positioning roll. It will be understood that the operator will hold the switch 493 in closed position as long as desired to rotate the motor in one direction. The circuit includes the leads to the common slip ring already described and leads 494 and 495 from the transformer. From the lead 494 circuit portions 496 and 497 join one slip ring with a motor lead 498. The lead 495 is connected by means of circuit portions 499 and 500 with the other slip ring and thence to the lead 501 for the motor. If desired to rotate the motor in the opposite direction the operator closes a second switch 502 which reverses the leads to the motor and moves the crankshaft positioning roll in the opposite direction. In this instance lead 498 and connected slip ring will be joined to the lead 495 by means of circuit portions 503 and 504, instead of with lead 494 as formerly, while the lead 501 and its associated slip ring will be connected by means of circuit portions 505, 506 and 507 with the lead 494.

*Operation of machine*

The operation of the machine as a whole will now be described. With the cradle in fixed position by means of the air cylinders which lock the cradle, the operator will first insert a crankshaft forging into the cradle. By means of the locating means 170, the shaft is properly positioned in the cradle. The hinged members 176 are then swung into position and the locking pins moved to securely hold the hinged members to the cradle frame. The operator then will move the air control to admit air to the opposite side of the piston in the air cylinders and unlock the cradle locking means. The switch for the cradle rotating motor is now closed and the cradle and shaft therein are rapidly rotated. The unbalance, if any, will show on the screen and the operator will then operate the controls for the motors which drive the positioning rollers for the crankshaft. The ends of the crankshaft will be moved within the cradle until a condition of balance is attained. After the shaft is properly positioned within the cradle, the operator will move the cam for operating the switch 338 to complete the circuit which includes the closed mercury switch to reverse the circuit to the motor 5 and act as a brake to assist in bringing the crankshaft and cradle to a stop.

The controls for the air cylinders are now moved to again lock the cradle in fixed position. The locking means 366 is also moved to locked position. The crankshaft is now in position to have the ends drilled in line with the axis of rotating balance. The operator starts the two motors 12 by means of switch 460. The motors cause the drills to rapidly rotate and slowly advance toward and then drill the ends of the crankshaft, whereupon the drills return to their original position. The timed cam operated switches 468 are opened after the cycle of operation has been completed to break the circuit through the coils 462 and stop the motors 12. The centered crankshaft is then removed from the cradle and another crankshaft forging placed in the cradle and the series of operations repeated.

*Modified cradle*

A modified cradle is illustrated in Figures 24–33, inclusive. In this embodiment of the invention the cradle may be adjusted to accommodate crankshafts of different lengths. The frame of the cradle is made up of two end portions 512 secured together by means of three equally spaced tubular members 513. Clamped to the three tubular members 513 by means of suitable clamping means 514 adjacent each of the end portions 512 are two adjustable supporting plates 515. The clamps 514 may be loosened whereupon the plates may be moved to a new position and again clamped in place. This enables the cradle to accommodate shafts of different lengths. Each plate acts as a support for two diametrically spaced motors 516 and crankshaft locating rollers 517 driven thereby. Hinged at 518 to the plates are members 519, each having an opening 520 therein. Within each opening 520 is a rod 521 which supports a roller 522 at one end thereof. A coil spring 524 within an enlarged portion of opening 520 is adapted to bias the roller radially toward the cradle center. The nuts 526 at the opposite end of the rod 521 act as an adjustable stop for the spring biasing movement. During the loading and unloading of the crankshaft the two hinged members will be thrown back as shown in dotted lines in Figure 27. The slidably lock pin 528, seen in Figures 24, 27 and 32, fits within aligned openings 530 and 532 formed in the supporting plate and hinge, respectively, and secures the latter to the plate during rotation of the cradle in the centering operation. Movement of the lock pin 528 to the right as viewed in Figure 32 will permit the operator to swing back the hinged member. A knob 534 secured to the locking pin at one end thereof enables the locking and unlocking operations to be readily accomplished. In the opposite end of the locking pin is a contact 536 insulated from the locking pin by suitable insulating material 537. Two spring biased plungers 538 are mounted in a suitable insulator 539 secured in the plate and are connected to wires forming a portion of the cradle rotating motor circuit. The contact 536 completes the electrical circuit to the cradle rotating motor and is a safety control, since the motor cannot be started unless the bolt is in locked position.

Figure 29:
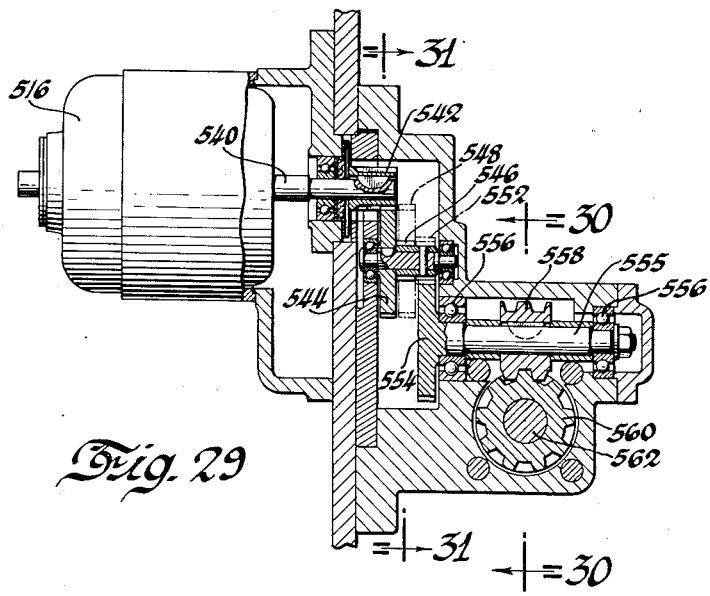
Figure 29 is a partial sectional view taken on line 29—29 in Figure 27 showing the motor and speed reducing means for driving the crankshaft locating rollers.
Figure 30:
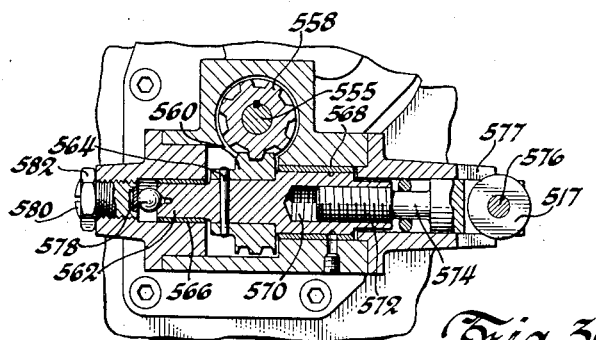
Figure 30 is a sectional view taken on line 30—30 in Figure 29.
Figure 31:
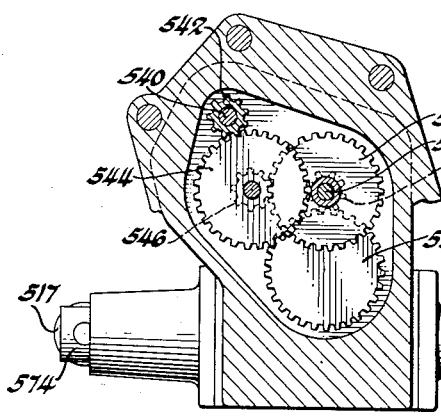
Figure 31 is a view taken on line 31—31 in Figure 29 showing the relation of the several gears of the speed reducing means.
Figure 32:
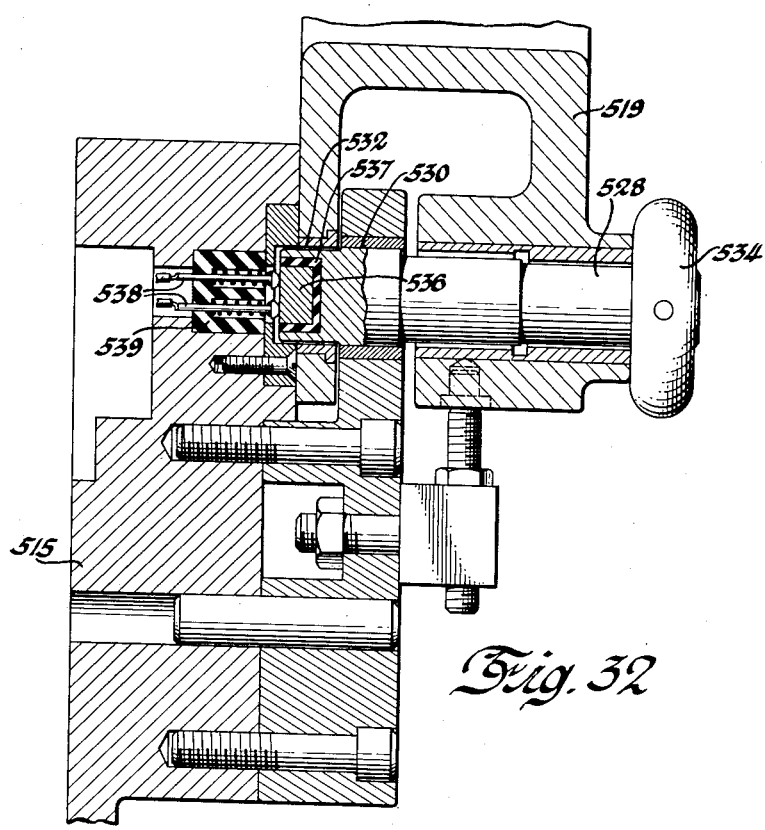
Figure 32 is a sectional view on line 32—32 in Figure 27 showing a detail of a portion of a locking bolt and a contact carried thereby.
Figure 33:
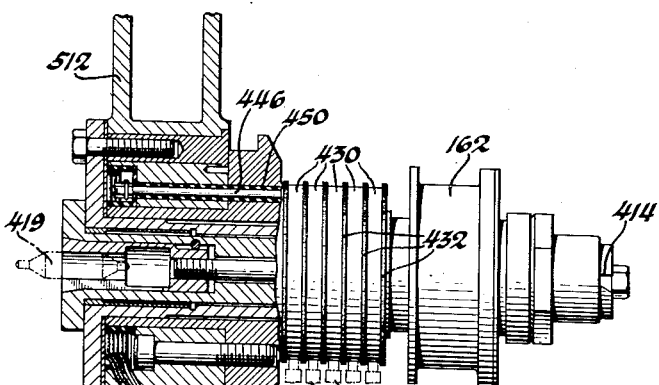
Figure 33 is a partial sectional view showing one end of the cradle illustrated in Figure 24 and electrical controls therefor.

A different form of speed reducing means for the crankshaft locating rollers is shown in detail in Figures 29, 30 and 31. This form is shown in conjunction with the modified cradle but may be, if desired, used in the first cradle in place of the means described therewith. Each motor 516 has a shaft 540 having a pinion 542 keyed thereto and meshing with and driving a gear 544 having a larger number of teeth than has pinion 542. Gear 544 is fixed to a pinion 546 which engages and drives a gear 548, the latter being fixed to a shaft 550, to which is secured a pinion 552. This pinion engages and drives a gear 554 fixed to a shaft 555 supported by means of bearings 556. Between the bearings and keyed to the shaft 555 is a gear 558 meshing with and driving a gear 560 secured to a shaft 562, as by means of a pin 564. Shaft 562 is rotatably supported by means of bearings 566 and 568 and has an internal screw-threaded portion 570 cooperating with the threaded end portion 572 of a roller supporting arm 574. Roller 517 is rotatably mounted on pin 576. It will be understood that the arm 574 may be moved axially by means of the screw-threaded end connection and is fixed against rotation by means of a slot 577 in which the roller 517 moves. A ball thrust bearing 578 is provided for shaft 562, the thrust bearing being adjustable as by means of the screw 580 and lock nut 582.

Figure 24:
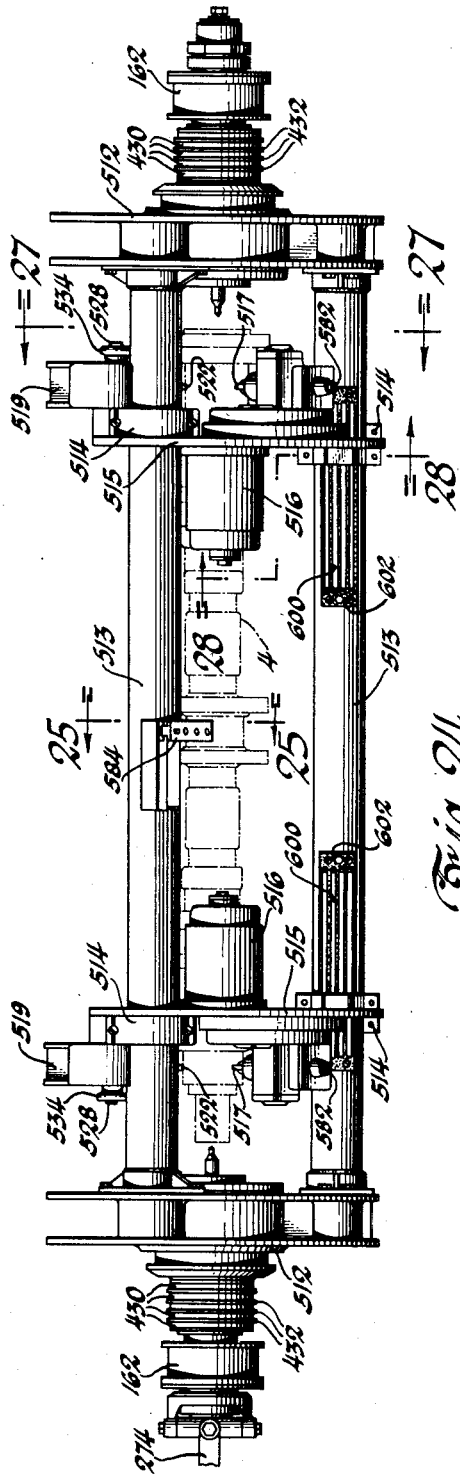
Figure 24 is a view showing a modified form of cradle which may be used in cases where crankshafts of different lengths are to be balanced and centered.
Figure 26:
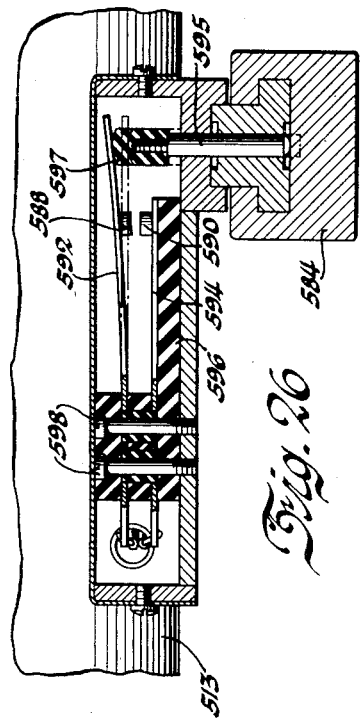
Figure 26 is a view on line 26—26 in Figure 25 showing a safety control switch.
Figure 25:
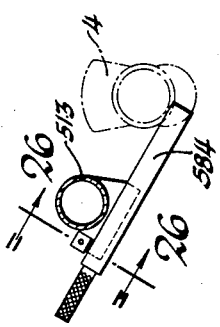
Figure 25 is a sectional view on line 25—25 in Figure 24 showing a crankshaft locating means that may be used with the cradle of Figure 24.
Figure 27:
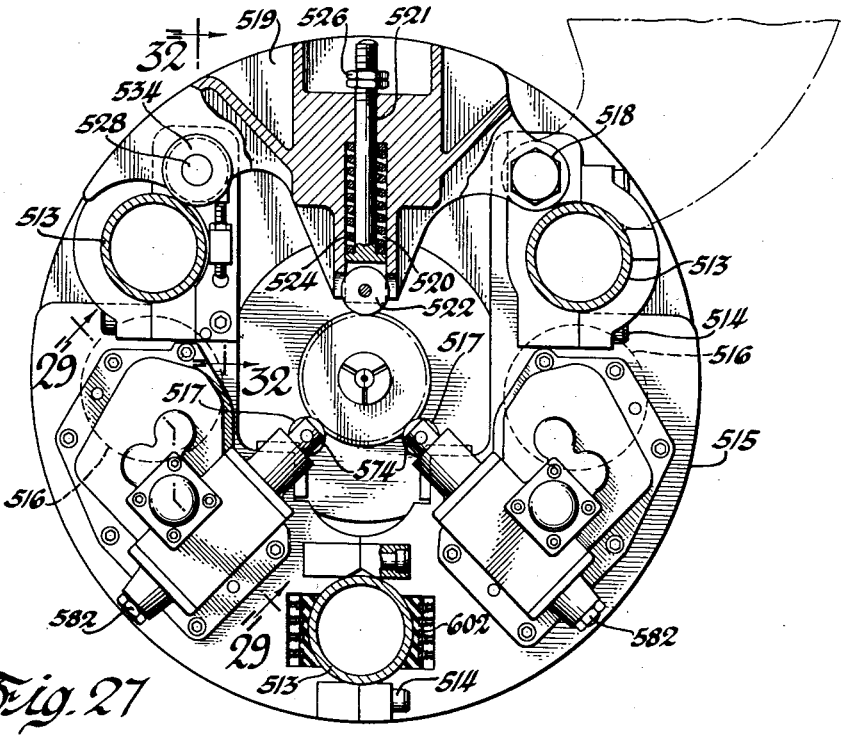
Figure 27 is a view on line 27—27 in Figure 24 showing motor driven rollers which may be used to vary the position of one end of the crankshaft within the cradle.

Referring to Figures 24, 25 and 26, a movable crankshaft locating device 584 is shown. The device is adapted to be moved to contact the crankshaft midway of its length in order to properly position the same in the cradle. If desired, a safety control may be used which is actuated by member 584. The controls include a switch, best seen in Figure 26. The switch comprises contacts 588 and 590 normally resiliently held in contact with each other. When the locating device is moved into the position shown in Figure 25, the contact 588 is moved away from contact 590 and breaks the electrical circuit to the motor for rotating the cradle and prevents the cradle from being rotated. The contacts 588 and 590 are carried by arms 592 and 594, respectively, arm 592 being a flat spring member, while member 594 is fixed in position. A plunger 595 having an end 597 of non-conducting material is moved by the locator 584 to move the spring arm 592 to the dot and dash position shown in Figure 26. The arms are insulated from the frame of the cradle by means of suitable non-conducting means generally indicated at 596. The contact arms are secured adjacent one end thereof to the cradle frame as by means of suitable cap screws 598. To the ends of the arms are secured the wires forming a portion of the circuit for the cradle rotating motor. Thus, it will be impossible to start the motor so long as the crankshaft locating device is in position.

Figure 28:
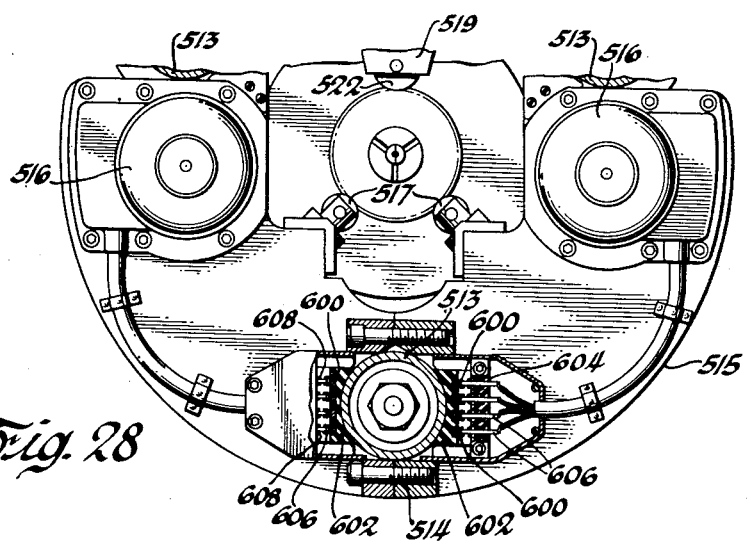
Figure 28 is a partial sectional view taken on line 28—28 in Figure 24.

The slip rings and brushes are similar to those already described and are indicated in the drawings by the same reference numerals. The leads from the slip rings to the motors on the cradle are placed within one of the hollow tubular members 513. In order to permit the motors and supports therefor to be moved to various positions as necessitated by crankshafts of different lengths, it is necessary to vary the lengths of the leads from the slip rings to the motors. This is accomplished, as best seen in Figure 28, by means of the bars 600, formed of suitable conducting material, secured to one of the tubular members 513 and insulated therefrom by means of suitable insulating means indicated at 602. Secured to the plates 515 which support the motors and insulated therefrom by members 604, are contacts 606. The contacts are resiliently held against the bars by means of springs 608. The several wires of the various circuits are connected to the bars 600. When the supports for the motors are moved along the tubular members 513 to a new position, the contacts move also and slide along the surface of the bars 600, maintaining a continuous connection therewith. Rod conductors insulated from the machine lead from the slip rings to wiring connected to the motors mounted on the cradle. These conductors and insulators are similar to those described in the first form of cradle and are designated by similar reference numerals; see Figure 33.

The operation of the second form of cradle is generally similar to that of the first form and need not be further described.

While the method and apparatus have been described in conjunction with a crankshaft forging, it will be understood that the method and apparatus are not limited to centering crankshafts and may be used for centering other objects, particularly shafts of various kinds.

In the form of my invention shown in the drawings, the cradle and other parts are shown in horizontal position. While the form shown is preferred and has certain advantages, I wish it to be expressly understood that the invention is not so limited and that the shaft may be centered in any desired position, as for example the vertical, as shown in my Patent 1,761,945, dated June 3, 1930.

Various changes and modifications in the construction and arrangement of the several parts may be made without departing from the spirit of my invention and I do not wish to limit the patent granted thereon other than as necessitated by the prior art.

I claim:

1. A mass centering machine including a substantially balanced support for holding work to be centered, means for rotating the support and work, means for testing the work for rotating balance and means for adjusting the work in the support to cause the work to assume a position of rotating balance while rotating the support and work.

2. In a device as set forth in claim 1, means associated with the support for marking the axis of balance.

3. In a device as set forth in claim 1, means for holding the support and work in fixed position, and means for drilling the ends of the work, when so held, in line with the axis of rotating balance.

4. A mass centering machine including a substantially balanced resiliently mounted cradle for holding the work, means for rotating the cradle and work, means for testing the work for rotating balance and means for moving the work within the cradle while the cradle is rotating.

5. A mass centering machine including a substantially balanced cradle for holding a shaft, means for rotating the cradle and shaft, means for testing the shaft for rotating balance and means supported by said cradle for moving the shaft laterally thereof while said cradle is rotating.

6. A device as in claim 5, in which the last mentioned means comprises motors and positioning rollers driven thereby.

7. In a mass centering machine, a cradle for supporting a shaft, means for resiliently supporting the cradle at both ends thereof, means for rotating said cradle and shaft, means for testing the shaft for rotating balance, means for moving said shaft while said cradle is rotating until the shaft is in rotating balance, means for thereafter locking said cradle and shaft, and means for drilling the ends of said shaft in line with the axis of rotation.

8. In a machine of the class described, a cradle for supporting a shaft therein, means for resiliently supporting the cradle at both ends thereof, means connected to one end of the cradle for rotating said cradle and shaft, means for testing the shaft for rotating balance, motors mounted on the cradle adjacent the ends thereof, positioning rollers, a portion of which are driven by said motors and electrical connections to said motors whereby they may be driven while the cradle is being rotated.

9. A device as in claim 8, in which the electrical connections include slip rings adapted to rotate with said cradle.

10. A device as in claim 8, in which there are two motors adjacent each end of the cradle, each of which drives one of the positioning rollers.

11. In a device of the class described, a horizontally disposed cradle, two motors adjacent each end thereof, a positioning roller for each motor and driven thereby, hinged members adjacent each motor, a roller supported by each hinged member and cooperating with said positioning rollers, a resilient support adjacent each end of the cradle for supporting the same in a vertical plane, a resilient support adjacent each end of the cradle for supporting the same in a horizontal plane, means for rotating said cradle, means for testing the shaft for unbalance, electric controls for each motor whereby the positioning rollers may be driven to move the shaft with respect to the frame, and means for marking the ends of the shaft in line with its axis of rotating balance.

12. A device as in claim 11, in which the last mentioned means comprises a means for drilling the ends of the shaft.

13. A device as in claim 11, in which the motors, positioning rollers, hinged member and roller at each end of the cradle are fixed to a supporting plate which is adjustable with respect to the remaining parts of the cradle to enable shafts of variable lengths to be centered.

14. A device as in claim 11 in which a means is provided to lock the cradle and shaft in fixed position and in which the marking means comprises a means for drilling the ends of the crankshaft while the cradle and shaft are in locked position.

15. In a device of the class described, a cradle having slip rings at each end thereof, two motors adjacent each end of the cradle, a positioning means driven by each motor, means for rotating the cradle, electrical connections to the slip rings and means for connecting the slip rings to the motors.

16. A device as in claim 15, in which the two motors and positioning means at each end of the cradle are fixed to a common support which is movable with respect to the frame of the cradle.

17. A mass centering machine including a substantially balanced yieldably mounted support for holding the work, means for rotating the support and work, means for testing the work for rotating balance and means for moving the work laterally of the support while the support is rotating.

THOMAS C. VAN DEGRIFT.